United States Patent Office 3,560,337
Patented Feb. 2, 1971

3,560,337
APPARATUS AND METHOD FOR AUTOMATIC MUTUAL ADJUSTMENT OF THE COOLANT AND MODERATOR PRESSURES OF A NUCLEAR REACTOR
Lorenzo Tonarelli, Effretikon, Switzerland, assignor to Sulzer Brothers, Ltd., Winterthur, Switzerland, a corporation of Switzerland
Filed Dec. 8, 1967, Ser. No. 689,125
Claims priority, application Switzerland, Oct. 26, 1967, 17,920/66
Int. Cl. G21c 15/00
U.S. Cl. 176—52                                              13 Claims

ABSTRACT OF THE DISCLOSURE

A levelling vessel is disposed outside the moderator vessel and is connected to both the moderator circuit in the moderator vessel and to at least one point in the coolant gas circuit. The pressures of the coolant and moderator are compared within the levelling vessel without using any other barrier medium. Branch pipes are provided off the lines to the levelling vessel to permit purification and return of the coolant and moderator to their respective circuits.

---

Figure 1:
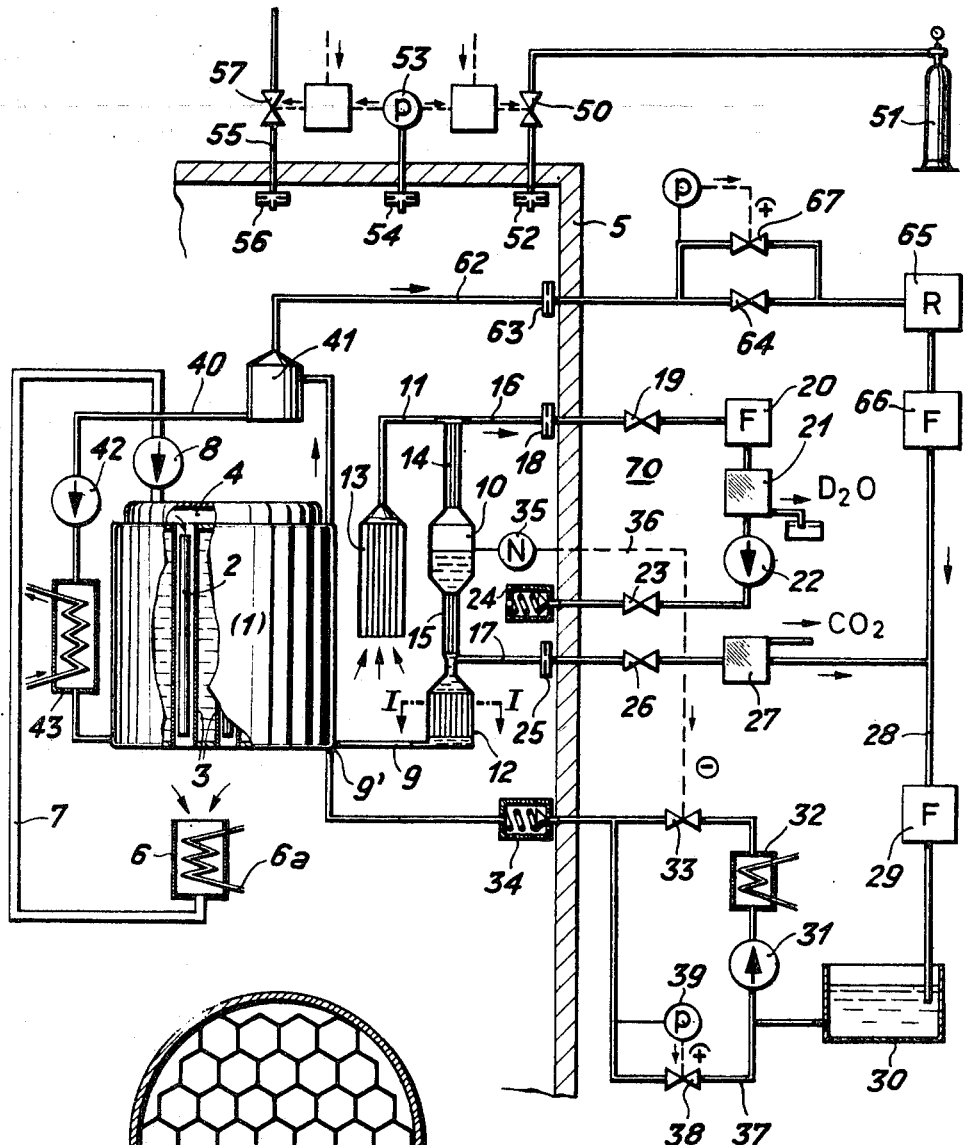

This invention relates to an apparatus and method for automatic mutual adjustment of the pressures of a liquid moderator and coolant gas flowing through a nuclear reactor.

Nuclear reactors of the gas-cooled type have had fuel rods disposed in separation tubes within a moderator vessel. In order to cool these fuel rods during operation, a coolant gas has been directed through the tubes while a moderator liquid has been directed around the tubes to absorb the neutron flux. Generally, it is desirable that the walls of the separation tubes be as thin as possible for purposes of neutron flux. However, since large pressure differences between the moderator liquid surrounding the separation tubes and the coolant gas flowing around the fuel rods inside the separation tubes can occur, these walls of the separation tubes can be subjected to high mechanical stresses which can cause thin walls to buckle as well as to break.

Accordingly, it is an object of the invention to eliminate large pressure differences on the walls of a separation tube in a nuclear reactor.

It is another object of the invention to compare the pressures of a gas coolant and liquid moderator in a nuclear reactor without using foreign liquid or solid closing means.

It is another object of the invention to mutually adjust the pressures of a gas coolant and liquid moderator of a nuclear reactor.

Briefly, the invention provides an apparatus and method for automatic mutual adjustment of the pressures of a liquid moderator and a gas coolant within a moderator vessel of a gas-cooled nuclear reactor. The gas flows through fuel rod containing separation tubes in the moderator vessel while the moderator flows into the moderator vessel at an adjustable rate. The apparatus of the invention includes a levelling vessel outside of the moderator vessel which is connected by connection pipes both to the moderator vessel and to at least one point in the gas coolant circuit. The connection pipes serve to convey the liquid moderator and the gas coolant into the levelling vessel. In addition, a straightener is incorporated in the inlet of the connection pipe connecting the gas coolant circuit to the levelling vessel while a similar straightener is incorporated in the connection pipe connecting the moderator vessel to the levelling vessel. According to the invention, branch pipes are connected to the connecting lines leading to the levelling vessel between the respective extraction points and levelling vessel in order to draw off both moderator contaminated with coolant and coolant contaminated with moderator. Additional straighteners can be incorporated in the connection pipes between the levelling vessel and each of the respective branch pipes. These straighteners are constructed in a manner, as used for example in aerodynamics, to divide a gas flow into a plurality of individual parallel flow paths in order to substantially eliminate turbulence and thereby to stabilize the flow. For example, the straighteners of the invention can be in the form of honeycomb grids. Alternatively, where appropriate, the straighteners can be replaced by porous elements, such as a tank with a loose granular filling or a tank containing sintered material, which fulfill the same function. The purpose of the straighteners in this invention is to hinder convective flow of the diffusing molecules. That is, the straighteners prevent moderator molecules diffused from the liquid in the levelling vessel into the gas space and possibly into the connection pipe from entering into the gas coolant circuit as well as gas molecules dissolved in the liquid in the levelling vessel from entering into the moderator vessel.

The method of the invention includes the step of drawing off the contaminated coolant and moderator through the respective branch pipes in quantities such that the flow speeds of the moderator and coolant between the respective extraction and branch-off points within the connecting lines are greater than the speeds of diffusion of the contaminating gas or moderator molecules.

During operation while the coolant pressure drops as the coolant flows through the separation tubes, especially while flowing around the fuel rods, the pressure increase in the moderator vessel is determined by the static level of the head of liquid within the moderator vessel. Thus, the pressures to which the internal and external surfaces of the separation tubes are exposed, and therefore the pressure differences, vary over the height of the moderator vessel.

The pressure ratios of the coolant are adjusted to those in the moderator vessel or vice versa. Since the coolant gas pressure is more important in reactor operation than the liquid moderator pressure, the moderator pressure is conveniently adjusted in many cases to the coolant pressure. Further, the supply of moderator to the moderator vessel can be controlled by the liquid level in the levelling vessel. To this end, a level detector is interposed in the levelling vessel to emit a signal in response to the liquid level for controlling a valve in the supply flow of moderator fed to the moderator vessel.

In one embodiment of the invention in order to minimize coolant or moderator losses, the quantity of coolant and/or moderator branched off the connecting line to the levelling vessel are returned to the coolant circuit or moderator vessel after separation of the moderator molecules and coolant molecules respectively. To this end, the branch pipe for contaminated coolant is connected to a coolant preparation circuit at a point after separation of the moderator molecules whereas the branch pipe for contaminated moderator is connected to a moderator preparation circuit at a point after separation of the gas molecules.

Figure 2:
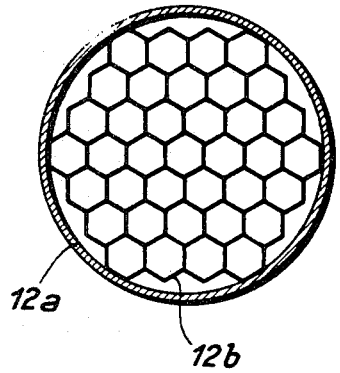

These and other objects and advantages of the invention will become more apparent from the following detailed description and appended claims taken in conjunction with the accompanying drawings in which:

FIG. 1 diagrammatically illustrates a nuclear reactor plant according to the invention; and FIG. 2 illustrates a view taken on line I—I of FIG. 1 of a straightener.

Referring to FIG. 1, the nuclear reactor plant has a moderator vessel 1 which houses a plurality of fuel rods 2 within individual separation tubes 3 secured, for example, by welding, to the top and bottom of the vessel 1. A coolant gas, such as carbon dioxide, is supplied to a distribution chamber 4 above the vessel 1 for flow through the separation tubes 3 about the fuel rods 2. The moderator vessel 1 is housed within a pressure vessel 5 constructed, for example, of concrete and has a liquid moderator, such as heavy water ($D_2O$) therein as is known.

A heat exchanger 6, for example, in the form of a steam generator, is positioned within the interior of the pressure vessel 5 below the moderator vessel 1. During reactor operation, heat is transmitted by nuclear fission to the coolant gas passing through the separation tubes 3. The heated coolant then flows out of the separation tubes 3 into the vacant interior of the pressure vessel 5, the pressure in the pressure vessel 5 thus being substantially equal to the pressure of the coolant emerging from the moderator vessel 1. The heated coolant then passes into the heat exchanger 6. In passing through the heat exchanger 6, the coolant transmits heat to a working medium flowing through tubes 6a in the heat exchanger 6. This working medium flows out of the pressure vessel 5 to a heat consumer, e.g. a steam turbine while the coolant gas coolant is drawn along a connection 7 by a blower 8 and recycled back through the distribution chamber 4 into the vessel 1.

The moderator vessel 1 is connected at an extraction point 9' at the bottom of the moderator vessel 1 to a connecting line 9 which leads into a levelling vessel 10 in order to convey moderator fluid within the moderator vessel 1 to the levelling vessel 10. In addition, a connecting line 11 connected to the levelling vessel 10 opens into the pressure vessel 5 to convey coolant gas from the gaseous atmosphere surrounding the moderator vessel 1 within the pressure vessel 5 to the levelling vessel 10.

Alternatively, the points of extraction can be located at other places in the moderator vessel 1 and coolant circuit. For example, the moderator liquid can be extracted at a point halfway up the moderator vessel 1 at a point where the static pressure of the liquid is lower than that prevailing at the bottom of the moderator vessel. Similarly, the gas coolant can be extracted from the separation tubes 3, for example, halfway up the moderator vessel. However, the selection of the coolant and moderator extraction points for pressure adjustment purposes depends entirely on the conditions in the nuclear reactor plant concerned.

A straightener 12 which is constructed of a honeycomb grid 12b surrounded by a tubular shell 12a (FIG. 2) to operate as described above is interposed in the connecting line 9 to divide the flow of liquid moderator into a plurality of parallel flow paths. A similarly constructed straightener 13 is interposed at the mouth of the connecting line 11 for dividing the coolant into a plurality of parallel flow paths. The straighteners 12, 13 each have a relatively large overall cross-section as compared to the respective connection lines 9, 11 so as to act as buffer chambers and absorb sudden shifts of conveyed medium. Consequently, gas coolant contaminated with moderator molecules cannot flow back against the general direction of flow into the coolant circuit from the connecting line 11, likewise moderator contaminated with gas molecules cannot flow back into the moderator vessel.

A straightener 14 similar to the above is connected in the connecting line 11 to the gas space in the levelling vessel 10 while another similar straightener 15 is connected in the connecting line 9 to the liquid space in the levelling vessel 10.

A branch line 16 is connected to the connecting line 11 at a point between the straighteners 13, 14 in order to draw off gas coolant while a similar branch line 17 is connected to the connecting line 9 between the straighteners 12, 15 in order to draw off liquid moderator. The quantities of coolant and moderator branched off the connecting lines are such that the flow speeds of coolant and moderator between the respective extraction and branch-off points are greater than the respective speeds of diffusion of the contaminating gas or moderator molecules. The branch line 16 leads through a pressure reducing device 18 having a fixed setting within the pressure vessel 5 as well as a valve 19 and a filter 20 wherein contaminants are separated out of the coolant drawn through the line 16 by a blower 22 downstream of the filter 20. In addition, a separator 21, for example, in the form of a condenser, is interposed in the line 16 for separating moderator molecules entrained by the coolant. The branch line 16 then leads through a valve 23 and a non-return valve 24 within the pressure vessel 5 to return the purified gas coolant into the pressure vessel 5. The branch line 17 leads through a pressure reducing device 25 having a fixed setting within the pressure vessel 5 as well as a valve 26 and a gas separator 27 which contains an absorbing medium for the entrained gas molecules into a line 28. The line 28 connects with a filter 29 which serves to separate contaminants from the moderator and thereafter empties into a moderator supply reservoir 30. A pump 31 is connected to the reservoir 30 to supply moderator via a conditioning device 32, for example, an economiser, through a valve 33 into a non-return valve 34 inside the pressure vessel 5. The non-return valve 34 is connected in turn to the moderator vessel 1 to recycle the moderator.

In order to adjust the pressure in the moderator vessel 1 to the presure of the coolant, a level detector 35 is connected to the levelling vessel 10 and controls the valve 33 via signal line 36 so as to regulate the level of moderator in the levelling vessel 10. In operation, the pressure in the moderator vessel 1 always bears a definite relation to the gas pressure in the pressure vessel 5. Thus, the pressure difference between the coolant gas flowing around the fuel rods 2 and the liquid moderator surrounding the separation tubes 3 can be kept within narrow limits. For instance, by suitably controlling the moderator level in the levelling vessel 10, the pressure differences over the length of the separation tubes are prevented from becoming so high as to cause the walls of the separation tubes to buckle.

During operation, the gas pressure in the separation tubes in the upper portion of the reactor moderator vessel 1 is greater than the moderator pressure whereas the bottom ends of the separation tubes, because of the static pressure increase in the moderator and the gas pressure drop caused by friction in the tubes, are subjected to higher pressures on the outside than on the inside. In order to prevent the bottom ends of the separation tubes from buckling, the liquid level in the vessel 10 is adjusted via the levelling vessel 10 and detector 35 so that, in particular, the moderator pressure acting on the bottom ends of the separation tubes is only slightly greater than the gas pressure acting on the same portions of the tubes from within.

It is noted that in some circumstances, a device for adjusting the liquid level in the levelling vessel 10 according to the load can be added so that in different operational conditions, for example, under partial load when less coolant is flowing through the reactor, the liquid level in the vessel 10 can be set lower in accordance with the lower gas pressure drop.

Further, in the event that the extracted gas coolant in the line 16 is not to be returned to the pressure vessel 5, the blower 22 and associated valves 23, 24 can be omitted. In this case, the extracted gas coolant is determined only by the pressure difference between the pressure vessel and discharge chamber 70 and by the flow cross-sections of the connecting lines and branch lines and of the pressure reducing valves and the like in them.

In order to continue operation should the level regulating system break down, a relief valve 38 is provided in a bypass line 37 to the valve 33. This relief valve 38 is controlled by a pressure responsive device 39 so that the valve 39 opens if an adjustable pressure limit is exceeded.

A coolant circuit 40 is connected to the moderator vessel 1 and contains a gas separator 41, a pump 42 and a cooler 43. A line 62 of a preparation circuit is connected to the top of the gas separator 41 to draw off moderator continually and to deliver the moderator through a pressure reducing device 63 having a fixed setting and a valve 64 to a regenerator device 65. The regenerator device 65 operates to return any gaseous moderator components which may have arisen from neutron bombardment to the liquid state. A separator 66 is connected downstream of the regenerator device 65 to remove impurities and to return the prepared moderator to the moderator supply reservoir 30 along the line 28 and filter 29 along with the moderator from the line 17 branched from the connecting line 9. A valve 67 in the form of a safety valve is also included in the preparation circuit in bridging relation to the valve 64 within a bypass in order to prevent the pressure in the moderator vessel 1 from exceeding an adjustable limit.

In order to maintain the gas pressure in the pressure vessel 5, a gas supply system provided with a feed valve 50 and a gas source 51 supplies fresh gas to the pressure chamber by way of a pressure reducing device 52 having a fixed setting. A pressure detector 53 is connected to the interior of the pressure vessel 5 via a pressure reducing device 54 having a fixed setting in order to detect the gas pressure within the pressure vessel. An extraction line 55 passes out of the pressure vessel 5 to permit gas to flow out of the pressure vessel 5 and includes a pressure reducing device 56 having a fixed setting at the mouth within the vessel 5. The extraction line 55 can be connected to a reservoir (not shown) for receiving the gas and includes a valve 57 which is operated by the pressure detector 53.

Finally, it is noted that the pressure reducing devices 18, 25, 63, 52, 54, 56 with fixed settings situated in the pressure vessel serve to damp any drop in the gas or moderator pressures in sufficient time should any pipe break outside the pressure vessel.

The embodiment described above is a preferred embodiment of the invention; however, the invention is not restricted to this embodiment. For instance, the invention can be applied to other reactor installations in which, for example, coolant gas flows into a closed pipe system instead of into a chamber housing the moderator vessel.

What is claimed is:

1. In combination with a gas-cooled nuclear reactor having a moderator vessel containing channels, means for directing a flow of coolant gas through said channels, a moderator liquid in the moderator vessel between the channels; a levelling vessel disposed outside said moderator vessel for receiving moderator liquid from said moderator vessel and coolant gas from the coolant gas circuit in mutual contact therein, a first connecting line connecting said levelling vessel at one end to at least one point in the coolant gas circuit, a second connecting line connecting said levelling vessel at an opposite end to the interior of said moderator vessel, a first branch line means connected to said first connecting line before its connection to said levelling vessel for drawing off coolant gas contaminated with moderator away from said moderator vessel and levelling vessel while causing the speed of the coolant gas in said first connecting line upstream of said first branch line means to be greater than the speed of diffusion of the contaminating moderator molecules and a second branch line means connected to said second connecting line before its connection to said levelling vessel for drawing off moderator liquid contaminated with coolant away from said moderator vessel and levelling vessel while causing the speed of the moderator liquid in said second connecting line upstream of said second branch line means to be greater than the speed of diffusion of the contaminating coolant molecules.

2. The combination as set forth in claim 1 further comprising a flow straightener means in at least one of said first and second connecting lines between said levelling vessel and a respective one of said first and second branch line means.

3. The combination as set forth in claim 1 further comprising a flow straightener means at the mouth of said first connecting line.

4. The combination as set forth in claim 3 wherein said flow straightener means divides the flow of coolant gas into a plurality of individual parallel flow paths to stabilize the flow.

5. The combination as set forth in claim 1 further comprising a flow straightener means in said second connecting line upstream of said second branch line means.

6. The combination as set forth in claim 5 wherein said flow straightener means divides the flow of moderator liquid into a plurality of individual parallel flow paths to stabilize the flow.

7. The combination as set forth in claim 1 further comprising a pressure reducing means having a fixed setting disposed in each of said branch line means for damping a drop in pressure in a respective one of said branch line means.

8. The combination as set forth in claim 1 further comprising a separator in said first branch line means for separating moderator molecules out of the coolant gas therein and a coolant preparation circuit connected to said first branch line means downstream of said separator for returning the coolant gas to said coolant gas circuit.

9. The combination as set forth in claim 1 further comprising a separator in said second branch line means for separating gas molecules out of the moderator liquid therein and a moderator preparation circuit connected to said second branch line means downstream of said separator for returning the moderator liquid to said moderator vessel.

10. In a process for the automatic adjustment of the pressure of a liquid moderator in a moderator tank of a gas-cooled nuclear reactor relative to the pressure of a coolant gas flowing through the reactor, the steps of communicating a levelling vessel at one side with the coolant gas through a first line and at an opposite side with the moderator liquid through a second line to receive coolant gas and moderator liquid in mutual contact therein, drawing off a quantity of coolant gas from the first line at a first branch point upstream of the levelling vessel with respect to the coolant gas flow to cause a flow speed of coolant in the first line upstream of the first branch point greater than the speed of diffusion of a contaminating moderator molecule from the levelling vessel whereby a contaminating moderator molecule is prevented from entering into the coolant gas upstream of the first branch line, and drawing off a quantity of moderator liquid from the second line at a second branch point upstream of the levelling vessel with respect to the moderator liquid flow to cause a flow speed of moderator in the second line upstream of the second branch point greater than the speed of diffusion of a contaminating coolant gas molecule from the levelling vessel whereby a contaminating coolant gas molecule is prevented from entering into the moderator liquid upstream of the second branch point.

11. In a process as set forth in claim 10 which further includes the step of maintaining the moderator liquid in the levelling vessel at a constant level.

12. In a process as set forth in claim 11 wherein said step of maintaining the moderator liquid at a constant level includes the controlling of moderator liquid supplied to the moderator tank in response to the pressure of the coolant gas in the levelling vessel.

13. In combination with a gas cooled nuclear reactor having a moderator vessel containing channels therein, means for directing a flow of coolant gas through said channels, and means for directing liquid moderator through said vessel between said channels;
- a levelling vessel disposed outside said moderator tank for receiving liquid moderator and coolant gas in mutual contact therein to indicate the relative pressure of the liquid moderator and coolant gas in said reactor,
- a first line connecting said levelling vessel to at least one point in the coolant gas circuit to direct a flow of coolant gas into said levelling vessel,
- a second line connecting said levelling vessel to the interior of said moderator tank to direct a flow of moderator liquid into said levelling vessel,
- a first branch line means connected to said first line upstream of said levelling vessel for drawing off coolant gas contaminated with moderator molecules from said levelling vessel at a rate to cause a speed of coolant gas in said first line upstream of said first branch line greater than the speed of diffusion of the moderator molecules, and
- a second branch line means connected to said second line upstream of said levelling vessel for drawing off liquid moderator contaminated with coolant molecules from said levelling vessel at a rate to cause a speed of liquid moderator in said second line upstream of said second branch line greater than the speed of diffusion of the coolant molecules.

References Cited

UNITED STATES PATENTS 3,342,689   9/1967   Jean-Claude Gaudez et al.
                                        176—52

FOREIGN PATENTS 849,308   9/1960   Great Britain _____ 176—60
868,318   5/1961   Great Britain _____ 176—60
627,803   9/1961   Canada _____ 176—60

CARL D. QUARFORTH, Primary Examiner

H. E. BEHREND, Assistant Examiner

U.S. Cl. X.R.

176—60